Jan. 19, 1954   C. H. SCRUGGS   2,666,415
FEEDING DEVICE FOR ANIMALS SUCH AS QUAIL
Filed May 25, 1951
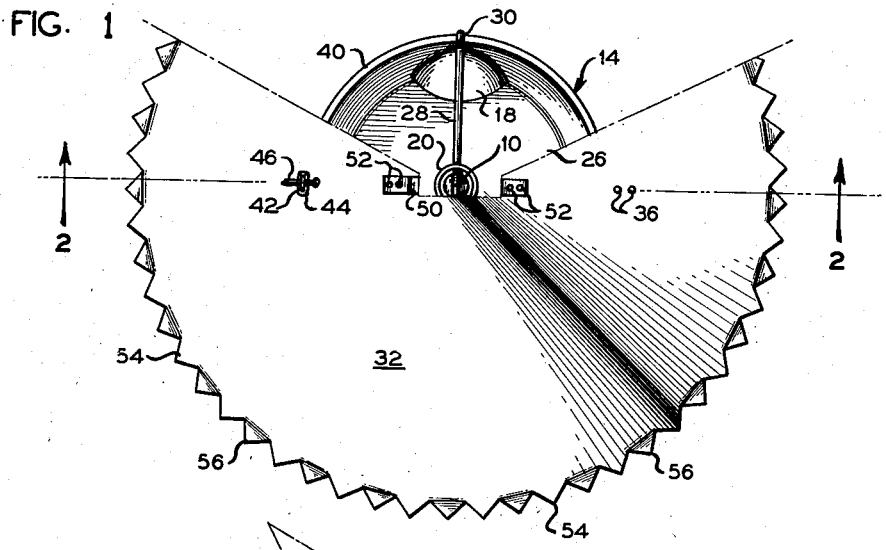
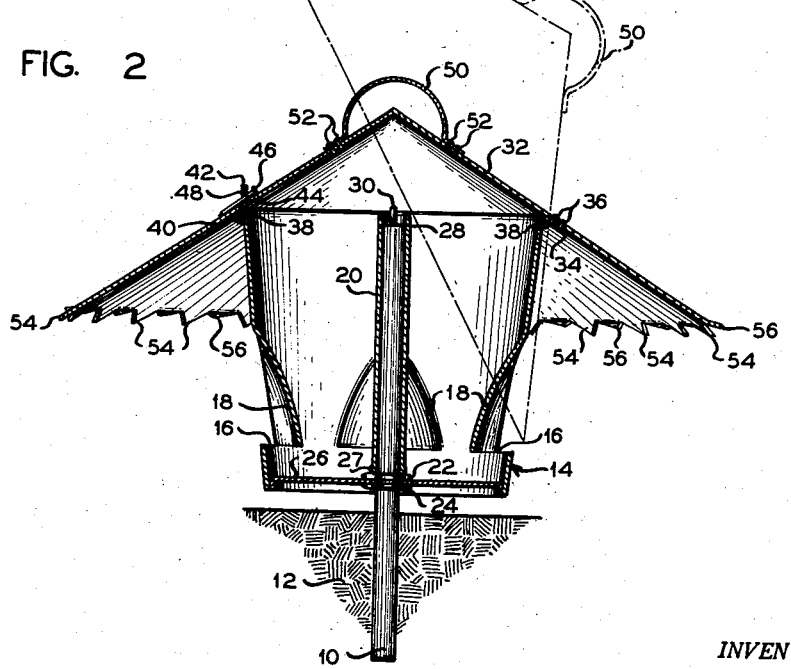
INVENTOR.
C. H. SCRUGGS
BY
ATTORNEY Patented Jan. 19, 1954

2,666,415

UNITED STATES PATENT OFFICE 2,666,415

FEEDING DEVICE FOR ANIMALS SUCH
AS QUAIL

Charles H. Scruggs, Tampa, Fla.

Application May 25, 1951, Serial No. 228,144

10 Claims. (Cl. 119—52)

This invention relates to animal husbandry and more particularly to the feeding of quail or the like. Specifically, the invention relates to a feeding device of a character to permit the use by animate objects of the size of quail and to exclude or at least discourage its use by larger birds and animals.

Feeders of various kinds have been employed, some of which have been produced for similar purposes, namely for the particular use of small fowl, but the devices previously employed have not prevented or discouraged use or access by larger birds or animals such as hogs which frequently tip over or upset feeders in order to devour the contents thereof.

Among the objects of the invention is to provide a simple and inexpensive feeder which can be produced of easily available materials, with minimum labor, and by means of which quail, or fowl of small size, may have easy and convenient access to the feed, while the use of the feeder by larger fowl or animals will be prevented or discouraged.

Another object of the invention is to provide a rotatable feeder which can be easily and simply manufactured from a conventional pail and the device can be anchored in place in such a manner that it cannot be easily overturned.

A further object of the invention is to provide a feeder and a conical cover with a saw-toothed peripheral edge which cover will serve not only as a roof to exclude the elements but as a guard to prevent animals and large fowl which it is not desired to feed from disturbing the contents thereof.

Further objects and advantages of the invention will be apparent from the following description taken in conjunction with the accompanying drawings, wherein:

Fig. 1 is a top plan view illustrating one application of the invention with a portion of the cover broken away; and Fig. 2, a section on line 2—2 of Fig. 1 with the cover illustrated in open position by phantom lines.

Briefly stated the invention comprises a receptacle for feed, a cover, and a support. The receptacle may be formed of a conventional pail with its side wall provided with horizontal slits and the wall struck inwardly above the same to provide a series of relatively small spaced openings to expose the feed in the bottom of the pail. The support extends through and is fastened to the bottom of the pail by a pair of lock nuts. A rod or brace extends through the upper end of the support and is fastened to opposite sides of the pail. The cover is of relatively flat conical shape and is provided with a central handle and is pivoted to the pail at one side and is detachably secured at the other side of the pail by means of a latch. The peripheral lower edge of the cover is provided with coarse saw-teeth in order that larger fowls and hogs will be scratched if they attempt to upset such cover. Thus a simple device of three primary parts is provided.

The outer portion of the cover or hood extends downwardly and outwardly to shield the feed openings from the driving rain or other inclement weather and to make the edge of the cover more formidable it is provided with coarse saw-teeth or prongs which are alternatively bent in opposite directions.

With continued reference to the drawings a support or anchor in the form of a pipe 10 is adapted to be driven into the ground 12 so that it cannot be easily upset or disturbed.

The feeder is preferably formed from a pail or other open-top receptacle 14 having a series of horizontal slits near its lower end and the material above the slits pressed inwardly to define said openings 16 below the lips on inwardly struck portions 18.

An additional pipe or tubular member 20 of somewhat larger size may be employed to form a bearing for receiving the upper end of the support 10 and lock nuts 22 and 24 engage opposite sides of bottom 26 of the receptacle around the central opening through which extends the threaded end portion 27 of the pipe 20 on which threaded portion they are mounted. In lieu of the lock nuts 23 and 24 the larger pipe 20 may be secured to the bottom of the receptacle in any other desired manner.

A transverse member in the form of a rod or brace 28 extends through the upper end of the larger pipe 20 and has its opposite ends 30 curled or fitted over and if desired welded, soldered, or otherwise secured to opposite sides at the top of the receptacle to prevent displacement thereof. Against this rod or brace 28 the upper end of the pipe or support 10 engages or seats within the pipe 20 thus rotatably mounting the feeding device and maintaining its bottom wall 26 slightly spaced above the earth.

A conical cover or hood 32 having a relatively short axis or forming a relatively flat cone, is hinged to one edge of the receptacle 14 by means of a clip or hinge 34 secured by rivets 36 or other suitable fastening means to the cover 32. The hinge clip 34 may be curled around or enclose a hinge or pintle member formed by the heavy wire annulus 38 which reinforces the bead 40 around the mouth of the pail thus providing a solid hinged connection. A portion of the bead is cut away so that it may be exposed to provide the pivot member of the hinge. Thus the conical cover is pivoted on the upper end of the receptacle at one side of the same.

The cover may be detachably fastened in position at the opposite side of the receptacle from the hinge and for this purpose a latch 42 is secured, welded or in any other appropriate manner, to the upper edge of the receptacle at a point diametrically opposite the hinge clip 34 and this latch may extend upwardly through a suitable opening 44 in the cover 32 or it may be attached to the upper surface of the cover. A latch pin 46 extends through a suitable opening 48 in the latch 42 so that the cover may be secured in closed position as illustrated in Fig. 2.

In order to transport the device the cover 32 may be provided with a handle 50 secured by rivets 52, welded or fastened in other suitable manner across the apex of the cover 32.

The conical cover 32 is of a diameter substantially twice that of the receptacle or larger as desired and when the feeder is installed the lower edge of the cover is spaced relatively close to the ground so that only quail or small animals can reach the feed. Also the feed openings are protected from the elements.

The lower peripheral edge of the cover is provided with integral saw-teeth or piercing prongs or points 54 and 56 alternatively bent downwardly and upwardly to make them more effective. The prongs provide substantially the only place at which a hog or cow or other animal can engage the feeder for upsetting it to expose the feed and with sufficient pressure exerted against the prongs impaling or at least scratching action will result causing the animal to move away or flee.

In installing the feeder the support or anchor pipe 10 is driven into the earth and the feeder telescoped over the same so that the upper end of the support is within the larger tube 20 whereupon the receptacle of the feeder and the cover can be rotated as a unit on the support. Also the feeder may be easily removed for transporting by lifting the same by the handle 50 and pulling up the support which has been driven into the earth.

It will be obvious that the feeding device of the present invention will provide convenient access for quail or other small birds and fowl to the feed openings 16, where they as well as the feed will be protected from the weather and from other animals of a predatory nature. It will be very difficult for any animal, particularly large animals such as cattle or hogs, to interfere with any birds feeding under the hood 32 or to overturn the device since the prongs 54 and 56 will stick into some portion of their bodies and the whole device will rotate about the pipe 10 rather than overturn.

It will be obvious to those skilled in the art that various changes may be made in the invention without departing from the spirit and scope thereof and, therefore, the invention is not limited by that which is shown in the drawings and described in the specification but only as indicated in the appended claims.

What I claim is:

1. A feeding device comprising a support adapted to be firmly implanted in the ground and extend upwardly therefrom, a receptacle having an open top and a central opening in the bottom wall thereof, and a tubular member extending upwardly from said opening, a transverse member extending across the upper portion of said tubular member and engaging the opposite upper edges of said receptacle, said support extending within said tubular member and engaging said transverse member for rotatably mounting said receptacle, said receptacle having a plurality of feed openings formed in the lower portion thereof with inwardly extending lips thereover, a conical hood pivotally connected to an upper edge portion of said receptacle and having an arcuate handle secured thereto across the apex thereof, a hood latch secured to the upper edge of said receptacle diametrically opposite to said pivotal connection, said hood having an opening for receiving said hood latch, and a latch pin extending through said hood latch exteriorly of said hood, said hood having an outer portion extending a substantial distance downwardly and outwardly to protect said feed openings and a plurality of prongs integrally formed along the peripheral edge thereof with alternate prongs being bent upwardly and downwardly.

2. A feeding device comprising a support adapted to be firmly implanted in the ground and extend upwardly therefrom, a receptacle having a central opening in the bottom wall thereof, and a tubular member extending upwardly from said opening, a transverse member extending across the upper portion of said tubular member and said receptacle, said support extending within said tubular member and engaging said transverse member for rotatably mounting said receptacle, said receptacle having a plurality of feed openings formed in the lower portion thereof, a conical hood pivotally connected to an upper edge portion of said receptacle and having an arcuate handle secured thereto adjacent the apex thereof, a hood latch secured to the upper edge of said receptacle diametrically opposite to said pivotal connection, said hood having an opening for receiving said hood latch, and a latch pin extending through said hood latch exteriorly of said hood, said hood having an outer portion extending a substantial distance downwardly and outwardly to protect said feed openings and a plurality of prongs integrally formed along a peripheral edge thereof with alternate prongs being bent upwardly and downwardly.

3. A feeding device comprising a support adapted to be firmly implanted in the ground and extend upwardly therefrom, a receptacle having a central opening in the bottom wall thereof, and a tubular member extending upwardly from said opening, a transverse member extending across the upper portion of said tubular member and said receptacle, said support extending within said tubular member and engaging said transverse member for rotatably mounting said receptacle, said receptacle having a plurality of feed openings formed in the lower portion thereof, a conical hood pivotally connected to an upper edge portion of said receptacle, a hood latch secured to the upper edge of said receptacle diametrically opposite to said pivotal connection, said hood being of a diameter substantially greater than said receptacle and having an outer portion extending a substantial distance downwardly and outwardly beyond said receptacle to protect and limit admission to said feed openings and a plurality of prongs integrally formed along a peripheral edge thereof with alternate prongs being bent upwardly and downwardly.

4. A feeding device adapted to be rotatably mounted on a support firmly implanted in the ground and extending upwardly therefrom, said device comprising a receptacle having a central opening in the bottom wall thereof, and a tubular member extending upwardly from said opening, a transverse member extending across the upper portion of said tubular member and engaging the opposite upper edges of said receptacle, said tubular member being adapted to receive said support with the latter engaging said transverse member for rotatably mounting said receptacle, said receptacle having a plurality of feed openings formed in the lower portion thereof with inwardly extending lips thereover, a conical hood pivotally connected to an upper edge portion of said receptacle and having an arcuate handle secured thereto across the apex thereof, a hood latch secured to the upper edge of said receptacle diametrically opposite to said pivotal connection, an opening in said hood for receiving said hood latch, and a latch pin extending through said hood latch exteriorly of said hood, said hood having an outer portion extending a substantial distance downwardly and outwardly to protect said feed openings and a plurality of prongs integrally formed along a peripheral edge thereof with alternate prongs being bent upwardly and downwardly.

5. A feeding device adapted to be rotatably mounted on a support firmly implanted in the ground and extending upwardly therefrom, said device comprising a receptacle having a central opening in the bottom wall thereof, and a tubular member extending upwardly from said opening, a transverse member extending across the upper portion of said tubular member, said tubular member being adapted to receive said support with the latter engaging said transverse member for rotatably mounting said receptacle, said receptacle having a plurality of feed openings formed in the lower portion thereof, a conical hood pivotally connected to an upper edge portion of said receptacle, a hood latch secured to the upper edge of said receptacle diametrically opposite to said pivotal connection, said hood being of a diameter substantially greater than said receptacle and having an outer portion extending a substantial distance downwardly and outwardly beyond said receptacle to protect and limit admission to said feed openings and a plurality of prongs integrally formed along a peripheral edge thereof with alternate prongs being bent upwardly and downwardly.

6. A feeding device comprising a support adapted to be firmly implanted in the ground and extend upwardly therefrom, a receptacle having a means for rotatably mounting said receptacle on said support, said receptacle having a plurality of feed openings formed in the lower portion thereof with inwardly extending lips thereover, a hood pivotally connected to an upper edge portion of said receptacle, a hood latch secured to the upper edge of said receptacle diametrically opposite to said pivotal connection, said hood being of a diameter substantially greater than said receptacle and having an outer portion extending a substantial distance downwardly and outwardly beyond said receptacle to protect and limit admission to said feed openings, a plurality of prongs integrally formed along a peripheral edge of said hood, alternate prongs being bent upwardly and downwardly.

7. A feeding device comprising a support, a receptacle rotatably mounted on said support and open at the top, a series of feed openings around the lower portion of said receptacle, a hood movably mounted relative to said receptacle and covering the open top thereof, said hood being of a diameter substantially greater than said receptacle and having an outer portion extending downwardly and outwardly beyond said receptacle protecting and limiting admission to said feed openings and a peripheral portion provided with saw tooth prongs.

8. A feeding device comprising, a receptacle adapted to be rotatably mounted on a support implanted in the ground, said receptacle being open at the top, a series of feed openings around the lower portion of said receptacle, a hood covering the open top of said receptacle, said hood being of a diameter substantially greater than said receptacle and having an outer portion extending downwardly and outwardly a substantial distance beyond said receptacle and limiting admission to said feed openings and a peripheral portion provided with saw tooth prongs.

9. A feeding device comprising a receptacle adapted to be rotatably mounted on a support implanted in the ground, said receptacle being open at the top, a series of feed openings around the lower portion of said receptacle, a hood movably mounted relative to said receptacle and covering the open top thereof, said hood being of a diameter substantially greater than said receptacle and having an outer portion extending downwardly and outwardly a substantial distance beyond said receptacle and limiting admission to said feed openings and a peripheral portion provided with saw tooth prongs.

10. A feeder for quail or other animals comprising a support, a receptacle mounted on said support and a cover for said receptacle, said receptacle being in the nature of a conventional pail having a substantially flat bottom and upstanding annular wall structure with one or more openings inwardly offset adjacent to but spaced above the bottom of the pail for the dispensing of feed therethrough said support being of a character to mount said receptacle in close proximity to the earth, said cover being of a diameter substantially greater than that of said receptacle and providing a substantial overhang with a peripheral edge spaced from the earth a distance substantially equal to the normal height of the quail or other animals fed and excluding access to the feed by larger animals.

CHARLES H. SCRUGGS.

References Cited in the file of this patent

UNITED STATES PATENTS

| Number | Name | Date |
|---|---|---|
| 1,404,251 | Westenberger et al. | Jan. 24, 1922 |
| 1,433,477 | Ritchie | Oct. 24, 1922 |
| 1,462,751 | Huntington | July 24, 1923 |
| 1,534,375 | Foucht | Apr. 21, 1925 |
| 2,273,616 | Beatty | Feb. 17, 1942 |
| 2,544,578 | Winkler | Mar. 6, 1951 |